FREDERIC A. WEISE.
Glass Molds.
No. 125,234.
Patented April 2, 1872.
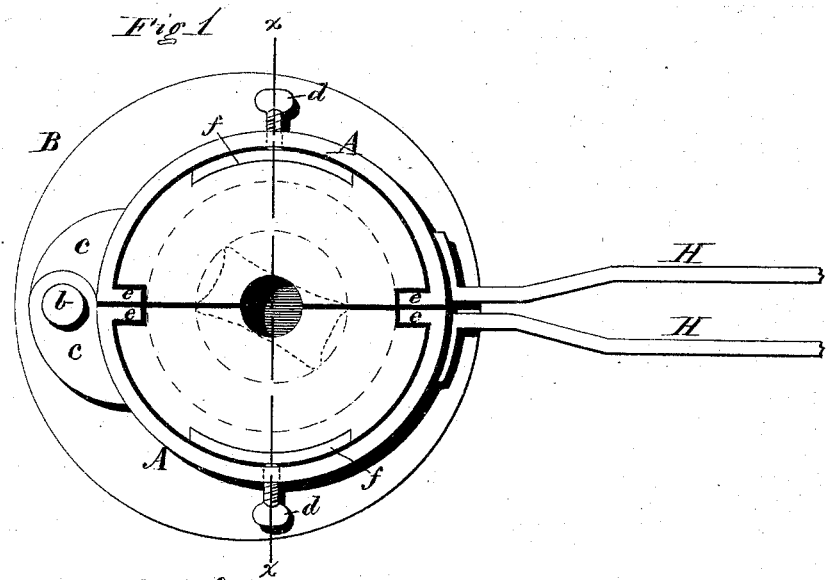
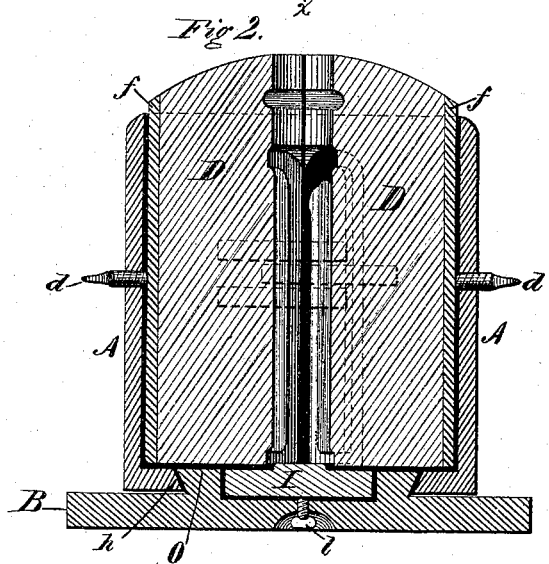
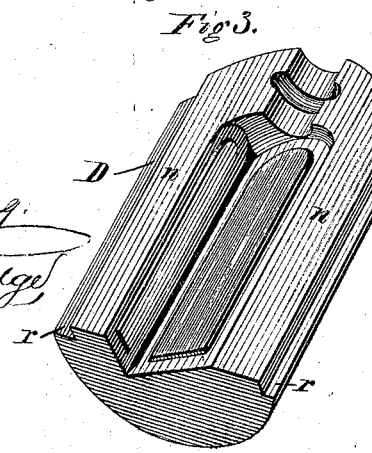

125,234

UNITED STATES PATENT OFFICE.

FREDERIC A. WEISE, OF BALTIMORE, MARYLAND, ASSIGNOR TO HIMSELF AND JOHN H. KING, OF WASHINGTON, D. C.

IMPROVEMENT IN GLASS-MOLDS.

Specification forming part of Letters Patent No. 125,234, dated April 2, 1872.

SPECIFICATION.

*To all whom it may concern:*

Be it known that I, FREDERIC A. WEISE, of Baltimore, in the county of Baltimore and State of Maryland, have invented certain Improvements in Glass-Molds, of which the following is a specification, reference being had to the accompanying drawing:

My invention consists in a shell or case for holding and operating the molds for forming articles of glass, as hereinafter more fully explained.

Figure 1 is a top-plan view; and Fig. 2, a vertical section of my shell with the molds therein. Fig. 3 is a perspective view of one part of a mold detached from the shell.

In molding bottles and similar articles of glass, it is customary to make the molds of metal, in sections—generally in two parts—hinged together, so that after the article has been formed therein, the mold can be separated or opened to remove the article. As each separate article must have a mold made especially for it, and these molds have to be made and kept very smooth, the expense of providing metal molds for a factory is very great, and requires great care.

My invention has for its object to reduce this expense and care, and thereby to expedite and cheapen the production of articles made of glass.

To accomplish this object, I first make a metallic shell or case, consisting of two semicircular parts, A A, so constructed that when placed together they will form a tubular shell or case, as represented in Fig. 1, each part being provided on its rear side with one or more ears or lugs, c, by means of which they can be hinged to each other, by inserting a pin, b, in a hole extending perpendicularly through said ears. To the front of each part A, a handle, H, is secured, by which the shell can be opened or closed at will, and also handled when closed. Each part A is also provided along its perpendicular edges, where they meet when closed, with an internal lip or flange, e, as shown in Fig. 1, and one or more set-screws, d, are inserted through the parts A at their center, as shown in Figs. 1 and 2. At their bottom these parts A are each also provided with an inwardly-projecting lip or flange, h, which is beveled at its inner edge, to engage, when closed, under a correspondingly-beveled projection, o, made on the upper surface of a base-plate, B, upon which the shell is placed when used, and which forms the bottom of the apparatus. This projection o, which is circular in outline, is recessed or hollowed out on its upper surface to receive a bottom mold, I, as shown in Fig. 2, and it has a thumb-screw, l, inserted, for the purpose of adjusting the bottom mold I, as may be necessary when in use.

Having thus constructed my case or shell, I then prepare molds of metal, clay, or any suitable material, with the required form of the article cut or otherwise formed on their inner faces, and insert them, from the top or bottom, within the parts A of the shell. These molds D will be formed externally of a shape and size to fit within the parts A, as represented in Fig. 2, and they are made with recesses r along the outer edges of their perpendicular faces, as represented in Fig. 3, for the lips e of the parts A to fit in, and thus hold the mold securely in the shell. These recesses are made full as deep, or a little deeper than the lips e are thick, so that when the shell is closed, the faces n of the parts of the mold may come in direct contact with each other, and be thus closed tightly together, so that when the glass is blown or pressed within the mold, there will be no fault or rib at their point of junction. In order to secure the parts D of the mold securely within the shell, and to keep them pressed firmly up to the required position, so as to make them fit snugly together when the shell is closed, the screws d are provided; and in case any other than metal molds are used, a metal plate, f, is inserted between them and the shell, for the point of the screw to bear against, as shown in Fig. 2.

I propose to make the molds of plastic material or compounds of any suitable kind—there being several such well known—as by so doing, they can be made far cheaper than of metal. With a plastic material the mold can be formed upon a wooden or other pattern of the article to be made, and then baked, and when placed within the shell, as above described, it can be used the same as the ordinary metal mold is now used; or, if preferred, they can be made of metal and fitted in the shell, and thus one shell will answer for a large number of molds of a similar character. In this way a great variety of designs can be produced at much less expense than by the present plan; these composition molds, when used with the shell, answering all the purposes of a metal mold.

By making the bottom piece I separate, it can readily be removed and another substituted, thereby enabling the same mold to be used, and the same form of bottle or other article to be produced with different designs formed on their bottom. As this bottom piece can also be formed of composition or clay, these different designs can be very cheaply produced; and thus druggists and others can have bottles made with any stamp or design they may prefer, with no additional expense except merely that of the piece I.

It is obvious that these shells may be made of any desired size and form, provided only, that they shall be so formed as to permit the molds to be inserted and held in place, as described.

Having thus described my invention, what I claim, is—

1. A shell for glass-molds, constructed substantially as described, whereby the molds may be held therein for use, as set forth.

2. The combination of the parts A A provided with the internal lips $e$, and the molds D provided with the recesses $r$, substantially as described.

3. The bottom plate B provided with a recess for the insertion of the removable bottom piece I, and a screw, $l$, for adjusting the same, substantially as described.

FREDERIC A. WEISE.

Witnesses:
W. C. DODGE,
PHIL. T. DODGE.